(12) United States Patent
Sack

(10) Patent No.: US 7,917,491 B1
(45) Date of Patent: Mar. 29, 2011

(54) CLICK FRAUD PREVENTION SYSTEM AND METHOD

(75) Inventor: Michael Sack, Marlborough, MA (US)

(73) Assignee: SuperMedia LLC, DFW Airport, TX (US)

( * ) Notice: Subject to any disclaimer, the term of this patent is extended or adjusted under 35 U.S.C. 154(b) by 1309 days.

(21) Appl. No.: 11/343,112

(22) Filed: Jan. 30, 2006

(51) Int. Cl.
*G06F 7/00* (2006.01)
*G06F 17/30* (2006.01)

(52) U.S. Cl. ........................... 707/708; 707/771

(58) Field of Classification Search .............. 707/1, 706, 707/708

See application file for complete search history.

(56) References Cited

U.S. PATENT DOCUMENTS

| | | | | |
|---|---|---|---|---|
| 7,085,741 | B2 * | 8/2006 | Lao et al. ......................... | 705/51 |
| 7,124,111 | B1 * | 10/2006 | Jemella et al. .................. | 705/38 |
| 7,698,217 | B1 * | 4/2010 | Phillips et al. .................. | 705/40 |
| 2003/0028529 | A1 * | 2/2003 | Cheung et al. .................... | 707/3 |
| 2003/0187759 | A1 * | 10/2003 | Arthus et al. .................... | 705/30 |
| 2003/0216930 | A1 | 11/2003 | Dunham et al. | |
| 2004/0153365 | A1 | 8/2004 | Schneider et al. | |
| 2004/0158528 | A1 | 8/2004 | Zuili | |
| 2004/0190448 | A1 | 9/2004 | Fishteyn et al. | |
| 2005/0108159 | A1 * | 5/2005 | Gravett et al. .................. | 705/40 |
| 2005/0125347 | A1 * | 6/2005 | Akialis et al. .................. | 705/40 |
| 2005/0144067 | A1 * | 6/2005 | Farahat et al. .................. | 705/14 |
| 2005/0154665 | A1 * | 7/2005 | Kerr ................................ | 705/35 |
| 2005/0209874 | A1 | 9/2005 | Rossini | |
| 2006/0053076 | A1 * | 3/2006 | Kremen .......................... | 705/51 |
| 2006/0161553 | A1 * | 7/2006 | Woo ................................ | 707/10 |
| 2007/0011078 | A1 * | 1/2007 | Jain et al. ........................ | 705/37 |
| 2007/0073579 | A1 * | 3/2007 | Immorlica et al. .............. | 705/14 |
| 2007/0094072 | A1 * | 4/2007 | Vidals et al. .................... | 705/14 |
| 2007/0129999 | A1 * | 6/2007 | Zhou et al. ...................... | 705/14 |

OTHER PUBLICATIONS

"How to Depend Your Website Against Click Fraud", Michael Bloch and Dmitri Eroshenko, Clicklab and Michael Bloch, 2004.*
Clickdefense.com website, Fort Collins, CO, Retrieved on Jan. 7, 2006 from the Internet (http://www.clickdefense.com/click_fraud.html), 2 pages.
Clickdetective.com website, Scottsdale, AZ. Retrieved on Jan. 7, 2006 from the Internet (http://www.clickdetective.com/), 2 pages.
Clickfacts.com website, Brookline, MA. Retrieved on Jan. 7, 2006 from the Internet (http://www.clickfacts.com/), 1 page.
Clicklab.com website, McLean, VA. Retrieved on Jan. 7, 2006 from the Internet (http://www.clicklab.com/solutions/click-fraud-detection/software-technology.html), 2 pages.
Clickrisk.com website, Toronto, ON, Canada. Retrieved on Jan. 7, 2006 from the Internet (http://www.clickrisk.com/services/detection/), 2 pages.
Hitslink.com website, Net Applications, Aliso Viejo, CA. Retrieved on Jan. 7, 2006 from the Internet (http://www.hitslink.com/), 3 pages.
Ppctrax.com website, Chandler, AZ. retrieved on Jan. 7, 2006 from the Internet (http://www.pptrax.com/index.php?id=16), 2 pages.

(Continued)

*Primary Examiner* — Kuen S Lu
*Assistant Examiner* — Binh V Ho
(74) *Attorney, Agent, or Firm* — Rader, Fishman & Grauer PLLC

(57) ABSTRACT

A click fraud prevention system and method that analyzes click patterns across multiple search engines and integrates with a website advertising management system that manages advertisements and bids across multiple search engines.

15 Claims, 2 Drawing Sheets

OTHER PUBLICATIONS

Visitlab.com website, Rockledge, FL. Retrieved on Jan. 7, 2006 from the Internet (http://www.visitlab.com/help/demo.html?Demo=GettingStarted), 1 page.

Whosclickingwho.com website, Santa Clara, CA. Retrieved on Jan. 7, 2006 from the Internet (http://www.whosclickingwho.com/auditor.html), 4 pages.

Delaney, Kevin J., "Web Startup Vie To Detect 'Click Fraud'", The Wall Street Journal Startup Journal, Jun. 10, 2005, Dow Jones & Company Inc., Princeton, NJ (retrieved from the Internet (http://startup.wsj.com/ecommerce/ecommerce/20050610-delaney.html) on Jan. 5, 2006, 3 pages).

Mann, Charles C., "How Click Fraud Could Swallow the Internet," Wired Magazine, The Condé Nast Publications Inc., New York, NY (retrieved from the Internet (http://www.wired.com/wired/archive/14.01/fraud_pr.html) on Jan. 7, 2006, 5 pages).

"Click Fraud," Wikipedia.org website, Wikimedia Foundation, St. Petersburg, FL. Retrieved on Jan. 5, 2006 from the Internet (http://en.wikipedia.org/wiki/Click_fraud), 4 pages.

* cited by examiner

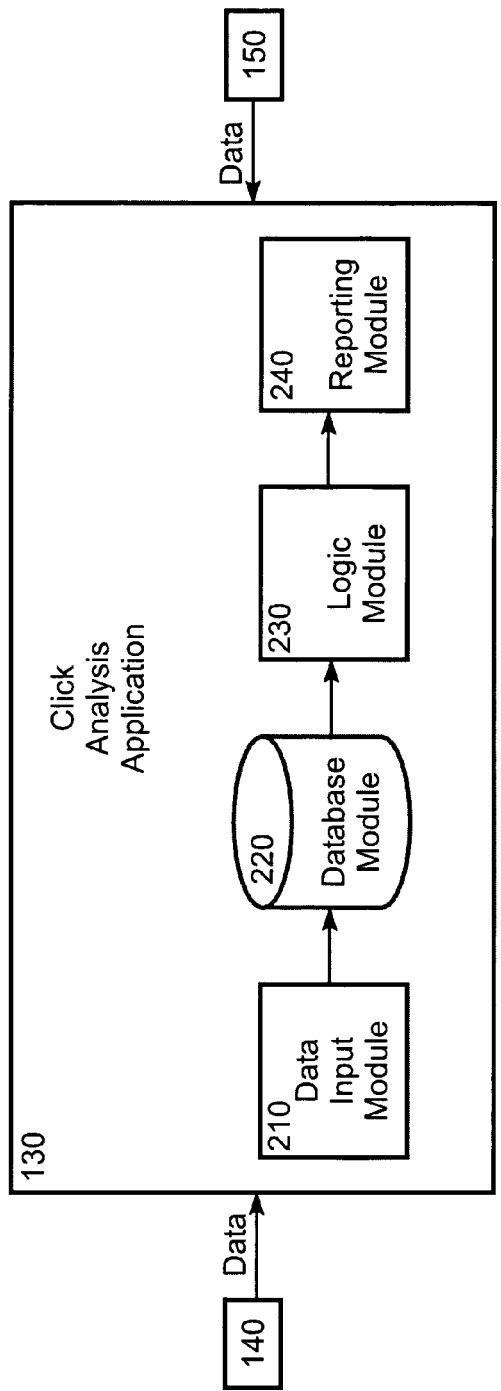

CLICK FRAUD PREVENTION SYSTEM AND METHOD

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2005-2006 Inceptor Inc.

CROSS REFERENCE TO RELATED APPLICATIONS

None.

FIELD OF THE INVENTION

The invention relates to electronic fraud detection and prevention. More specifically, the invention relates to detecting and preventing fraud related to online advertising. Even more specifically, the invention relates to detecting and preventing click fraud for pay-for-placement (PFP) search engine marketing.

BACKGROUND OF THE INVENTION

The Pay-For-Placement Search Engine

Starting in 2001 with Overture (formerly known as GoTo, now known as Yahoo! Search Marketing), a new type of search engine emerged where advertisers could "bid" for a specific ranking or position on keywords or phrases in a search engine. Contrary to algorithmic-based search engines, which use complex formulas to evaluate an actual web page and determine its relevancy to a specific keyword or phrase, an advertiser could simply "buy" its way to the top of search results pages. This was designated as "pay-for-placement" (PFP) search. Pay-per-click advertising includes pay-for-placement (PFP) and pay-for-ranking. Pay-per-click (PPC) advertising is sometimes called cost-per-click (CPC) advertising. Pay-for-placement is sometimes also called pay-for-performance.

After the creation of networks for distributing PFP advertisements from search engines to multiple other websites (including other search engines), PFP search became very effective. During 2002, the popularity of this model soared with increased spending on these programs by advertisers as well as an onslaught of additional PFP engines and ancillary support tools. As the popularity of PFP advertising increased, the demand for PFP tools increased.

Click Fraud.

Click fraud occurs in pay-per-click online advertising when a person, automated script, or computer program imitates a legitimate user of a web browser clicking on an advertisement, usually for the purpose of generating an improper charge per click. Click fraud is also called "click spam" by Yahoo. Each time an online advertisement is clicked, the owner (advertiser) of the advertisement is charged. An advertiser's PPC budget can be exhausted with multiple, successive, fraudulent clicks. Click fraud is perpetrated by many actors, including (1) those who use click fraud to increase their own personal banner advertisement revenues (via affiliate programs such as Google AdSense that place search engine advertisements on third-party websites and pay affiliates for received clicks), (2) companies who use click fraud as a way to deplete a competitor's advertising budget, (3) those who perpetrate click fraud for non-financial reasons. Fraudulent clicks originate from (1) sophisticated programs (or "bots") that automatically click on designated companies' paid search ads, and/or (2) individuals or groups of individuals. The bots are designed to be very deceptive, using proxy servers and so forth, and can switch from search engine to search engine. Individuals and bots can dynamically change their IP address to avoid detection.

Search engine vendors and their affiliates, such as Google (with its Google AdWords service) and Yahoo (with its Yahoo Search Marketing (formerly Overture) service) directly benefit from all clicks generated by advertisements that they serve, whether the clicks are legitimate or fraudulent. Third-party websites that participate in search engine affiliate programs (such as Google AdSense) also directly benefit from click fraud. Search engine vendors are indirectly harmed by click fraud, because as click fraud increases, the vendors' advertiser clients may become frustrated with the decreased value of the services provided by the search engines. Advertisers are directly harmed by click fraud, since they pay for every click served by search engine vendors, whether the clicks are legitimate or not.

The definition of what constitutes click fraud varies depending on one's perspective. An advertiser and a search engine vendor may not agree on what constitutes click fraud. For example, if one company is researching a competitor and clicks on the competitor's PPC advertisement, that may not constitute click fraud. If the same company returns to the PPC advertisement one month later and clicks on it, that may not constitute click fraud. But clicking on it weekly or daily may constitute click fraud. And creating a program to automatically click on advertisements would most certainly constitute click fraud, especially if it were intentional. Click fraud, therefore, is determined by a combination of factors, including frequency of the actions, intent of the actors, and the identification of the actors (whether human or computer).

Inceptor's Prior Inventions.

Inceptor is the current assignee of this and other patent documents that relate to search engine marketing, some of which are discussed below.

United States Patent Application 20020038350 (Lambert et al., Mar. 28, 2002) titled "Method & system for enhanced web page delivery" discloses, in the abstract, "A system for and method of enhancing web page delivery. The invention provides the ability to control redirection of Web traffic of humans and search engine spiders. It can differentiate between these types of visitors to a Web page, track their movements, log critical information, and analyze the Web traffic in order to judge the success in driving quality traffic to some known goal on a Web site, such as a sale. The system may generate dynamically optimized web pages targeted to specific search engines, in order to optimize the search engine ranking and visibility of a Web site, such as an online marketer's Web site."

U.S. Pat. No. 6,654,754 (Knauft et al., Nov. 25, 2003) titled "System and method of dynamically generating an electronic document based upon data analysis" discloses, in the abstract, "A system and method of generating index information for electronic documents. The system includes a client, one or more information retrieval (IR) engines, such as a search engine, which are each in communication with each other via a network. In one embodiment of the invention, the server maintains a plurality of data objects that are protected by digital rights management (DRM) software. Upon receiving a network request from one of the IR systems, the server dynamically generates an electronic document that provides index information that is associated with one of the data objects. In one embodiment of the invention, the server dynamically generates the contents of the electronic document based upon the indexing characteristics of the IR system. Furthermore, upon receiving a network request from one of the client, the server determines whether the client is authorized to access the data object that is associated with the network request. If the client is authorized to access the data object, the server transmits the data object to the user. Alternatively, if the client is not authorized to access the data object, the server dynamically prepares instructions to the client, the instructions describing additional steps the user at the client may perform to get authorized to access the data object."

U.S. Pat. No. 6,981,217 (Knauft et al., Dec. 27, 2005) titled "System and method of obfuscating data" discloses, in the abstract, "A system and method of generating index information for electronic documents. The system includes a client, one or more information retrieval (IR) engines, such as a search engine, which are each in communication with each other via a network. In one embodiment of the invention, the server maintains a plurality of data objects that are protected by digital rights management (DRM) software. Upon receiving a network request from one of the IR systems, the server dynamically generates an electronic document that provides index information that is associated with one of the data objects. In one embodiment of the invention, the server dynamically generates the contents of the electronic document based upon the indexing characteristics of the IR system. Furthermore, upon receiving a network request from one of the clients, the server determines whether the client is authorized to access the data object that is associated with the network request. If the client is authorized to access the data object, the server transmits the data object to the user. Alternatively, if the client is not authorized to access the data object, the server dynamically prepares instructions to the client, the instructions describing additional steps the user at the client may perform to get authorized to access the data object."

U.S. patent application Ser. No. 10/883,556 (Sack, Jul. 1, 2004) titled "BID MANAGEMENT OPTIMIZATION SYSTEM AND APPARATUS," discloses, in the abstract, "Bid management with a robust set of rules that ties bids to actual site-side performance. From site-side performance data, the invention creates an optimal portfolio of keywords by determining optimal mix of keywords, position, and bids to achieve greatest return for risk, comparing keywords against one another to determine allocation of budget, and automatically implementing recommendations." With this invention, an advertiser can manage multiple P4P search engine accounts from a single interface. The 10/883,556 application is hereby incorporated by reference in its entirety.

DESCRIPTION OF PRIOR ART

Several patents discuss the problem of click fraud.

United States Patent Application 2003/0216930 (Dunham et al., Nov. 20, 2003) is titled "Cost-per-action search engine system, method and apparatus." Dunham notes (para. 0011) that click fraud is "prevalent among PPC engines and has been a real, and virtually unmanageable, impediment to the growth of this industry." Dunham goes on to propose a "cost-per-action" model, where advertisers would not pay on a CPC basis, but based on something more, an "action," such as a conversion or a sale occurring at the advertiser's website. Search engine providers have been reluctant to offer this type of advertising program, because they can accurately measure what happens at their own website (i.e. clicks) but cannot do so at the advertisers' websites.

United States Patent Application 2004/0153365 A1 (Schneider et al., Aug. 5, 2004) titled "Method For Detecting Fraudulent Internet Traffic" shows a system designed to detect fraudulent click patterns ranging from automated click processes to incentive-based forms through the use of "click clubs." This information is stored and analyzed in a database which is then used to control the flow of click traffic to an advertiser website. Schneider proposes creating a "bad traffic database" to block fraudulent Internet traffic at its source. The problems with this approach, which is essentially the same "black list" approach used by early anti-spam software, include that (1) sometimes a user is required to enter information into an intermediate website to "validate" himself or herself; (2) some legitimate users can find that they are in the bad traffic database because they share the same IP address (or domain name or other identifying characteristics) as fraudulent clickers, and this would be a false positive; and (3) fraudulent clickers can easily change their IP address to avoid detection, much like early spammers did to avoid spam blacklist databases, as click fraud is a moving target.

United States Patent Application 2004/0158528 A1 (Zuili, Aug. 12, 2004) titled "Method Improving Pay-Per-Click Web-Based Search Engines, And The Like" describes a method for monitoring a pay-per-click arrangement through the use of a serial number validation process between the host and search engine user. The validation is based upon multiple criteria including user information and click frequency. Zuili proposes assigning a unique serial number for each website user to determine if certain clicks are illegitimate. The problems with this approach include that (1) several embodiments require the user to have Java, Javascript, ActiveX, or cookies installed and enabled, all of which the user can disable to defeat the system; (2) some legitimate users can find that they are in the bad traffic database because they share the same IP address (or domain name or other identifying characteristics) as fraudulent clickers, and this would be a false positive; and (3) fraudulent clickers can easily change their IP address to avoid detection, much like early spammers did to avoid spam blacklist databases, as click fraud is a moving target.

United States Patent Application 2004/0190448 (Fishteyn et al., Sep. 30, 2004) is titled "System and method for ranking the quality of internet traffic directed from one Web site to another." Fishteyn discloses a system and method of determining quality ranking of user traffic directed from at least one traffic producer (e.g. search engine) website to a traffic consumer (e.g. advertiser) website by placing an intermediary computer between the traffic producers and traffic consumers. A problem with this approach is that there is no mechanism provided for managing bids or advertisements across multiple search engines.

United States Patent Application 2005/0144067 (Farahat et al., Jun. 30, 2005) is titled "Identifying and reporting unexpected behavior in targeted advertising environment." Farahat discloses a keyword searching environment monitor that is designed to store and analyze web site behavior in order to separate legitimate human traffic from fraudulent computer-generated traffic (para. 0054). Problems with this approach include that (1) a user could mistakenly click on link that is designed to identify only automated agents, thereby getting mis-classified as fraudulent computer-generated traffic and (2) human users can easily defeat the system by simply intentionally clicking on links, as is common in "click clubs" and the like.

United States Patent Application 2005/0209874 A1 (Rossini, Sep. 25, 2002) titled "Platform for managing the targeted display of advertisements in a computer network" shows a system that functions as a shared server management platform for businesses to provide advertising links or for a host to display advertisement links. The system manages advertising and host services through a shared server platform. Each entity is identified by its own management code. The system captures user profile metadata which is then analyzed daily against specified criteria including IP frequency in order to identify fraudulent clicking patterns. These results are provided in a report format (FIG. 3, elements 60-62, and claims 3-6). In particular, Rossini discloses a system for the targeted contextual display of advertisements on the Internet and discusses eliminating fraudulent clicking patterns by IP address (para. 0082). One problem with this approach is that fraudulent clickers can easily change their IP address to avoid detection, much like early spammers did to avoid spam blacklist databases, as click fraud is a moving target.

There are some ways to identify and combat click fraud.

Advertisers can, on their own, monitor the effectiveness of their advertisement by using free services from the search companies, such as conversion-tracking services that help determine which clicks generated customer sales. But the search companies' tools do little to help advertisers identify, much less prevent, fraudulent clicks.

Advertisers also can conduct forensic analyzes of their web server log files. But analyzing log files is time-consuming, especially for small advertisers. Also, since log files can be tampered with, search engine companies may be reluctant to refund advertisers for fraudulent clicks based on this web server log file statistical data.

Several similar-sounding companies have developed similar-sounding product and service offerings to identify and track click fraud, including ClickDefense.com (www.clickdefense.com), ClickDetective (www.clickdetective.com), ClickFacts (www.clickfacts.com), Clicklab (www.clicklab.com), Clickrisk (www.clickrisk.com), HitsLink by Net Applications (www.hitslink.com), PPCtrax.com (www.ppctrax.com), Visitlab (www.visitlab.com), and WhosClickingWho (www.whosclickingwho.com). The problem with all of these approaches is that the advertisers (and/or the search engines) are required to place snippets of code (typically some Javascript code) on their web servers and/or in their advertisements, which can be cumbersome and time consuming, especially if an advertiser has multiple search engines, target domain names, landing pages, advertisements, and/or keywords to manage.

None of the above provides a click fraud prevention system and method that (1) requires no software to be installed on the advertiser's web servers or the search engine's web servers, (2) analyzes click patterns across multiple search engines, and (3) integrates with a website advertising management system that manages advertisements and bids across multiple search engines. What is needed, therefore, is a click fraud prevention system that overcomes the above-mentioned limitations and that includes the features enumerated above.

BRIEF SUMMARY OF THE INVENTION

In accordance with one aspect of the present exemplary embodiment, a computerized advertising management system programmed to: receive a click from a search engine that is associated with a user; redirect the click to a target website; receive user data from the target website about the user's behavior at the target website; analyze, via a click analysis application, click data associated with the click and the user data associated with the user in order to determine if the user is conducting click fraud.

In accordance with another aspect of the present exemplary embodiment, a computerized advertising management system programmed to: receive a click from a search engine that is associated with a user; redirect the click to a target website; receive user data from the target website about the user's behavior at the target website; analyze, via a click analysis application, click data associated with the click and the user data associated with the user in order to determine if the user is conducting click fraud; modify, via a bid management application, an advertiser bid for the keyword associated with the search term that generated the click; modify, via an advertisement management application, an advertisement associated with the click.

In accordance with yet another aspect of the present exemplary embodiment, a method of detecting click fraud comprising: providing an advertising management system for managing advertisements, managing bids, and detecting fraud across multiple search engines; wherein the advertising management system has: an advertisement management application for managing advertisements from multiple search engines; a bid management application for managing advertiser bids and keywords from multiple search engines; a click analysis application for analyzing click data from multiple search engines and user data from multiple websites; wherein the click analysis application is programmed to: receive a click from a search engine that is associated with a user; receive user data from the target website about the user's behavior at the target website; analyze, via a click analysis application, click data associated with the click and the user data associated with the user in order to determine if the user is conducting click fraud; generate reports about the click data and user data.

In accordance with another aspect of the present invention, a computerized method of identifying fraudulent clicks from pay-for-placement search engines, the method comprising receiving clicks on pay-for-placement links, associated with a target website, from multiple pay-for-placement search engines, storing IP addresses associated with the clicks, redirecting the clicks to the target website, aggregating the IP addresses, analyzing aggregated IP addresses, identifying fraudulent clicks based on patterns of activity across the multiple pay-for-placement search engines. The invention can store user data accompanying the clicks, and generated by user actions at the target website. Aggregated user data can be analyzed with the IP addresses. The invention generates a report identifying fraudulent clicks associated with the target website, for requesting a correction of click charges.

BRIEF DESCRIPTION OF THE DRAWINGS

In the drawings, closely related figures and items have the same number but different alphabetic suffixes. Processes, states, statuses, and databases are named for their respective functions.

FIG. 2 is a diagram of the click analysis application.

TERMINOLOGY

Figure 1:
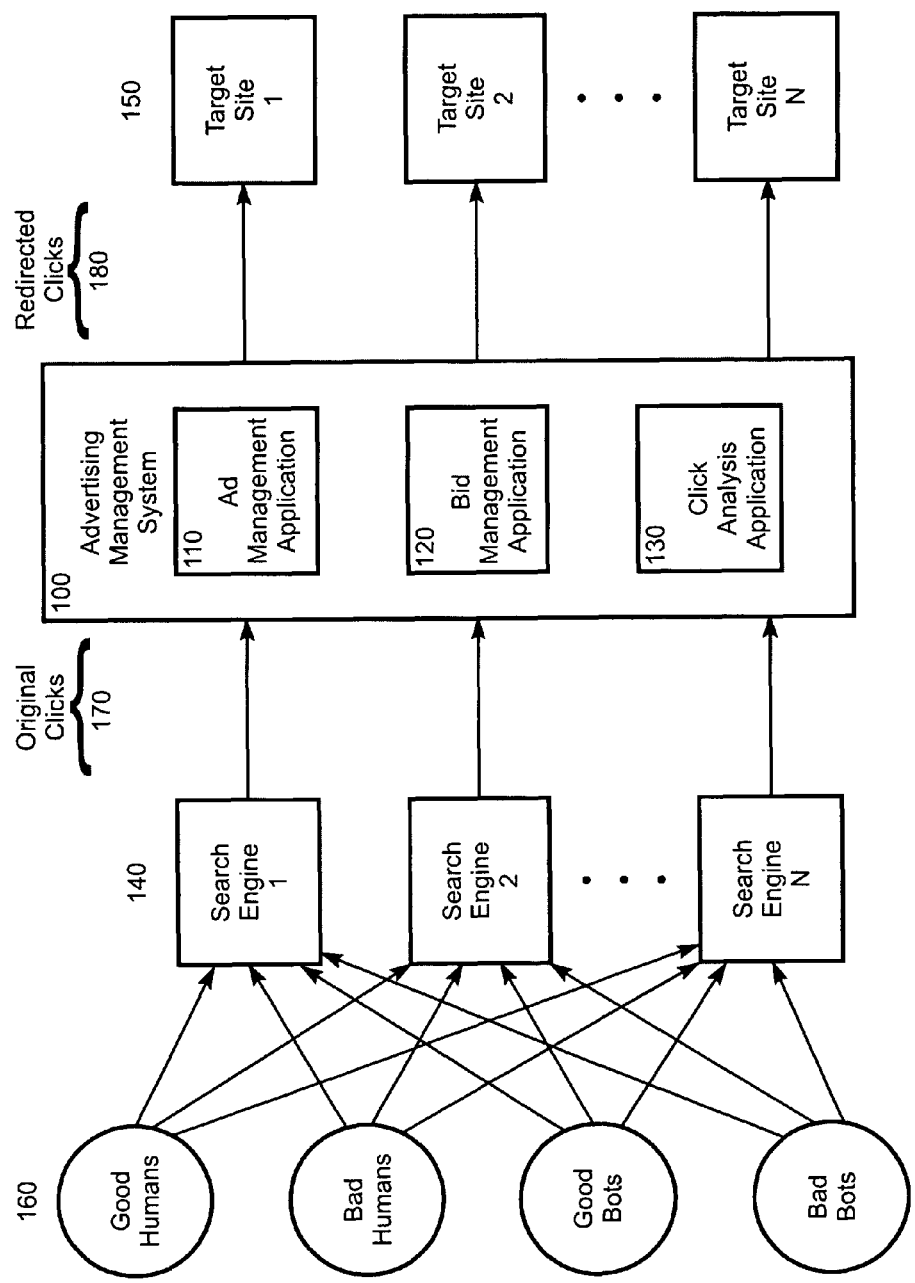
FIG. 1 is a diagram of the advertising management system operating between a plurality of search engines and target websites.

FIG. 1
advertising management system 100
advertisement management application 110
bid management application 120
click analysis application 130
search engines 140 target websites 150
users 160 (includes good humans, bad humans, good bots, and bad bots)
original click 170
redirected click 180
FIG. 2
data input module 210
database module 220
logic module 230
reporting module 240
click data (from search engines 140)
user data (from target websites 150)

DETAILED DESCRIPTION OF THE INVENTION, INCLUDING THE PREFERRED EMBODIMENT

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Referring now to FIG. 1. The invention is a system and method for detecting fraudulent clicks of pay-per-click online advertisements. In the preferred embodiment, the click analysis application operates as part of an advertising management system 100 in conjunction with a bid management application 110 and an advertisement management application 120. The advertising management system 100
(a) manages PFP advertisement across multiple search engines via the advertisement management application 110,"
(b) manages PFP keywords and bids across multiple search engines via the bid management application 120, and
(c) detects click fraud across multiple search engines through via the click analysis application 130.

The advertising management system 100 is content management system (CMS) used for use by advertisers and advertising agencies in managing PFP advertising campaigns.

Users 160 include good humans and good bots, who are not conducting click fraud, and bad humans and bad bots, who are conducting click fraud. Users include human operators operating with all ranges of intent. Bots includes, but is not limited to, programs, spiders, crawlers, scripts, modules. zombie networks, or other means use to automatically generate clicks. Uses connect to search engines 140 via a communications network (not shown), such as the Internet. Search engines 140 connect to the advertising management system 100 via a communications network (not shown). Advertising management system 100 connects to target websites 150 via a communications network (not shown). Each user or bot generally has an IP address associated with a click.

The bid management application 120 manages advertisements on a multiple search engines 140 for target websites 150. Each advertisement (not shown), however, is not linked directly to the target website. Instead, each advertisement is linked to the bid management application 120. When an advertisement is clicked by one of the users 160, the original click 170 is first sent to the bid management application 120. The bid management application then sends the redirected click 180 to one of the target websites 150.

Funneling clicks through bid management application 120 allows the bid management application 120 to receive data accompanied with each click across multiple search engines. This click data includes, but is not limited to, originating advertisement, keyword(s) associated with advertisement, search term(s) used by user, IP address of user, browser used, search engine used, and time of the click.

Click Fraud perpetrators often jump between multiple search engines 140, to avoid creating patterns detectable by any one particular search engine. By sending all click data to a central portal, namely the bid management application 120, the present invention detects click fraud patterns across multiple search engines.

Referring now to FIG. 2. The click analysis application 130 receives click data via the data input module 210. Click data is stored in database module 220. Click data is analyzed by logic module 230. Reports are generated via reporting module 240.

The present invention uses pattern matching algorithms in the logic module 230 to compare click data received across multiple search engines to look for click patterns. Even if there is randomization, sooner or later click patterns emerge. Additionally, the bid management application 120, unlike the search engines 140, communicates with the target websites 150 and can detect a user action(s) after landing on a page. The click analysis application 130 receives user data, i.e. data about the user action(s) after landing on a page, via the data input module 210. In this way, the bid management application 120 collects data not only about the original clicks 170 and redirected clicks 180, but also about the visitor's action(s) at the target website. (When a user accesses a website, the user becomes a website visitor.) This data is used in the pattern matching algorithm of the logic module 230. For example, if the visitor does not go beyond the first page of the target website, this may suggest a fraudulent click. After matching click fraud patterns, the bid management application 120, via the reporting module 240, produces reports, which can be used, for example, by advertisers to document to search engine companies when, where, and to what extent the click fraud occurred in order to get a refund or credit.

In the preferred embodiment, the click analysis application 130 is written in the Java programming language and runs on a server computer accessible via a web browser from a client computer or device. In the preferred embodiment, the server hardware is an Intel-based PC, the operating system is Linux, the web server software is Apache, and the database module 220 is an Oracle database.

Other Embodiments

The click analysis application 130 encompasses alternate embodiments of the software program in which the functions of the system are performed by modules different than those shown in the FIGS. The click analysis application 130 may process the data in a serial or parallel fashion, or a combination of the two, without departing from the spirit or scope of the invention. The software program may be written in one of several widely available programming languages, and the modules may be coded as subroutines, subsystems, or objects depending on the language chosen. Similarly, data used click analysis application 130 is described and represented as logical records embodied in a database but the invention is not limited to the described arrangement of data records, nor is the use of any particular type of data management system implied. Relational database systems from vendors such as Oracle, Sybase, Informix, or Microsoft provide the necessary infrastructure for managing the underlying data in the system, whether it is centralized or distributed, but other organizational data structures, e.g. indexed flat files or XML-based data structures, may be substituted without exceeding the scope of the invention.

The advertisement management application 110, the bid management application 120, and the click analysis application 130 may be implemented on one single physical server, multiple servers, virtual servers, distributed servers, or any combination thereof. Users 160 may access search engine via may be a computers, PDAs, cellphones, or any hardware or software device operative to communicate with a server.

The communication network can be any wired or wireless network capable of sending and receiving information, including, but not limited to, the Internet, intranets, LANs, WANs, telephone networks, cellular networks.

Furthermore, alternate embodiments of the invention that implement the click analysis application 130 in hardware, firmware, or a combination of both hardware and software, as well as distributing the modules and/or the data in a different fashion will be apparent to those skilled in the art and are also within the scope of the invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The invention claimed is:

1. A computer-readable storage medium including computer executable instructions to:
   receive a click from a search engine, the click being associated with a user and directed to a target website;
   redirect said click to said target website;
   receive user data from said target website about said user's behavior at said target website;
   analyze click data associated with said click and said user data associated with said user in order to determine if said user is conducting click fraud, wherein
   said click data includes data relating to clicks responding to links provided by different search engines; and
   transmit a click fraud report to more than one of the different search engines.

2. The computer-readable medium of claim 1, further comprising instructions to store user data accompanying said clicks.

3. The computer-readable medium of claim 1, further comprising instructions to generate a report if it is determined that said user conducted click fraud.

4. The computer-readable medium of claim 1, further comprising instructions to generate a report identifying fraudulent clicks associated with said target website.

5. The computer-readable medium of claim 1, further comprising instructions to request a correction of click charges based on a finding of click fraud.

6. A computerized advertising management system programmed to:
   receive, in a computer, a click from a search engine, the click being associated with a user;
   redirect said click from the computer to a target website;
   receive user data from said target website, said data relating to said user's behavior at said target website;
   analyze click data associated with said click and said user data associated with said user in order to determine if said user is conducting click fraud;
   modify an advertiser bid for a keyword associated with a search term that generated said click;
   modify an advertisement associated with said click; and
   transmit a click fraud report to more than one of the different search engines.

7. The computerized advertising management system of claim 6, wherein said click data includes data relating to clicks responding to links provided by different search engines.

8. The computerized advertising management system of claim 6, further programmed to generate a report if it is determined that said user conducted click fraud.

9. The computerized advertising management system of claim 6, further programmed to transmit a click fraud report to multiple pay-for-placement search engines.

10. The computerized advertising management system of claim 6, further programmed to request a correction of click charges based on a finding of click fraud.

11. A system, comprising:
    an advertising management system for managing advertisements, managing bids, and detecting fraud across multiple search engines; wherein said advertising management system is included in at least one computer that has:
    an advertisement management application for managing advertisements from multiple search engines;
    a bid management application for managing advertiser bids and keywords from multiple search engines;
    a click analysis application for analyzing click data from multiple search engines and user data from multiple websites; wherein the click analysis application is programmed to:
       receive a click from a search engine, the click being associated with a user and directed to a target website;
       redirect said click to said target website;
       receive user data from said target website, said data relating to said user's behavior at said target website;
       analyze click data associated with said click and said user data associated with said user in order to determine if said user is conducting click fraud, wherein said click data includes data relating to clicks responding to links provided by different search engines; and
       generate, and transmit, to more than one of the different search engines, a report about said click data and said user data.

12. The system of claim 11, wherein the click analysis application is further programmed to generate a report if it is determined that said user conducted click fraud.

13. The system of claim 11, wherein the click analysis application is further programmed to request a correction of click charges based on a finding of click fraud.

14. A method, comprising:
    receiving a click from a search engine, the click being associated with a user and directed to a target website;
    redirecting the click to the target website;
    receiving user data from said target website, said user data including information regarding the user's interaction with the target website;
    determining whether the user conducted a click fraud by analyzing click data associated with the click and the user data associated with the user, wherein the click data includes clicks responding to links provided by different search engines and transmitting a click fraud report to more than one of the different search engines.

15. The method of claim 14, further comprising:
    generating a click fraud report if it is determined that the user conducted click fraud, the click fraud report identifying fraudulent clicks associated with the target website;
    transmitting the click fraud report to multiple pay-for-placement search engines; and requesting a correction of click charges based on the report.

* * * * *